(12) United States Patent
Kuehneman

(10) Patent No.: US 6,966,333 B1
(45) Date of Patent: Nov. 22, 2005

(54) RAINWATER COLLECTION DEVICE

(76) Inventor: Bret A. Kuehneman, 20604 Northville Place Dr., North #1816, Northville, MI (US) 48167

( * ) Notice: Subject to any disclaimer, the term of this patent is extended or adjusted under 35 U.S.C. 154(b) by 0 days.

(21) Appl. No.: 10/159,072

(22) Filed: May 31, 2002

(51) Int. Cl.[7] ............................................. E03B 3/02
(52) U.S. Cl. ...................... 137/357; 137/376; 137/585; 52/16
(58) Field of Search ............................... 137/357, 376, 137/577, 583, 584, 585, 587, 588; 52/16

(56) References Cited

U.S. PATENT DOCUMENTS

| | | | |
|---|---|---|---|
| 371,697 A * | 10/1887 | Miller | 137/584 |
| 594,326 A * | 11/1897 | Coda | 137/376 |
| 754,801 A * | 3/1904 | Pomroy | 137/584 |
| 1,460,613 A * | 7/1923 | Sill | 137/585 |
| 1,597,283 A * | 8/1926 | Thomas | 52/16 |
| 3,730,120 A | 5/1973 | Dobell | |
| 4,726,151 A * | 2/1988 | Vitale | 52/16 |
| D326,705 S * | 6/1992 | Vanden burg et al. | D23/205 |
| 5,190,157 A * | 3/1993 | Przytulla | 206/519 |
| D335,744 S | 5/1993 | Small et al. | |
| 5,301,474 A * | 4/1994 | Carey et al. | 52/16 |
| 5,315,090 A * | 5/1994 | Lowenthal | 52/16 |
| 5,490,538 A | 2/1996 | Marcel et al. | |
| 5,607,075 A * | 3/1997 | Burgdorf et al. | 220/319 |
| 5,730,179 A | 3/1998 | Taylor | |
| 5,863,151 A | 1/1999 | Chapotelle | |
| 5,873,383 A | 2/1999 | Takai et al. | |
| 6,357,183 B1 * | 3/2002 | Smith | 52/16 |
| 6,526,699 B1 * | 3/2003 | Foglio, Sr. | 137/357 |

* cited by examiner

*Primary Examiner*—John Rivell

(57) ABSTRACT

A rainwater collection device for collecting rainwater from a gutter for later usage. The rainwater collection device includes a housing having a bottom wall and a peripheral wall extending upwardly from the bottom wall. The peripheral wall has a top edge defining an opening extending into the housing. A top wall defines a cover which is positionable on the housing for selectively opening and closing the opening in the housing. A supply pipe extends through and is attached to the top wall. The supply pipe is removably coupled to the gutter such that water in the gutter may enter the housing through the supply pipe. A drainage pipe is in fluid communication with the housing. The drainage pipe extends into the peripheral wall and is positioned generally adjacent to the bottom wall. A valve is positioned in the drainage pipe for selectively opening and closing the drainage pipe.

5 Claims, 5 Drawing Sheets

RAINWATER COLLECTION DEVICE

BACKGROUND OF THE INVENTION

1. Field of the Invention

The present invention relates to rainwater collectors and more particularly pertains to a new rainwater collection device for collecting rainwater from a gutter for later usage.

2. Description of the Prior Art

The use of rainwater collectors is known in the prior art. More specifically, rainwater collectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,730,179; U.S. Pat. No. 5,863,151; U.S. Pat. No. 5,873,383; U.S. Pat. No. 5,490,538; U.S. Pat. No. 3,730,120; and U.S. Des. Pat. No. 335,744.

While these devices fulfill their respective, particular objectives and requirements, the aforementioned patents do not disclose a new rainwater collection device. The inventive device includes a housing having a bottom wall and a peripheral wall extending upwardly from the bottom wall. The peripheral wall has a top edge defining an opening extending into the housing. A top wall defines a cover which is positionable on the housing for selectively opening and closing the opening in the housing. A supply pipe extends through and is attached to the top wall. The supply pipe is removably coupled to the gutter such that water in the gutter may enter the housing through the supply pipe. A drainage pipe is in fluid communication with the housing. The drainage pipe extends into the peripheral wall and is positioned generally adjacent to the bottom wall. A valve is positioned in the drainage pipe for selectively opening and closing the drainage pipe.

In these respects, the rainwater collection device according to the present invention substantially departs from the conventional concepts and designs of the prior art, and in so doing provides an apparatus primarily developed for the purpose of collecting rainwater from a gutter for later usage.

SUMMARY OF THE INVENTION

In view of the foregoing disadvantages inherent in the known types of rainwater collectors now present in the prior art, the present invention provides a new rainwater collection device construction wherein the same can be utilized for collecting rainwater from a gutter for later usage.

The general purpose of the present invention, which will be described subsequently in greater detail, is to provide a new rainwater collection device apparatus and method which has many of the advantages of the rainwater collectors mentioned heretofore and many novel features that result in a new rainwater collection device which is not anticipated, rendered obvious, suggested, or even implied by any of the prior art rainwater collectors, either alone or in any combination thereof.

To attain this, the present invention generally comprises a housing having a bottom wall and a peripheral wall extending upwardly from the bottom wall. The peripheral wall has a top edge defining an opening extending into the housing. A top wall defines a cover which is positionable on the housing for selectively opening and closing the opening in the housing. A supply pipe extends through and is attached to the top wall. The supply pipe is removably coupled to the gutter such that water in the gutter may enter the housing through the supply pipe. A drainage pipe is in fluid communication with the housing. The drainage pipe extends into the peripheral wall and is positioned generally adjacent to the bottom wall. A valve is positioned in the drainage pipe for selectively opening and closing the drainage pipe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rainwater collection device apparatus and method which has many of the advantages of the rainwater collectors mentioned heretofore and many novel features that result in a new rainwater collection device which is not anticipated, rendered obvious, suggested, or even implied by any of the prior art rainwater collectors, either alone or in any combination thereof.

It is another object of the present invention to provide a new rainwater collection device which may be easily and efficiently manufactured and marketed.

It is a further object of the present invention to provide a new rainwater collection device which is of a durable and reliable construction.

An even further object of the present invention is to provide a new rainwater collection device which is susceptible of a low cost of manufacture with regard to both materials and labor, and which accordingly is then susceptible of low prices of sale to the consuming public, thereby making such rainwater collection device economically available to the buying public.

Still yet another object of the present invention is to provide a new rainwater collection device which provides in the apparatuses and methods of the prior art some of the advantages thereof, while simultaneously overcoming some of the disadvantages normally associated therewith.

Still another object of the present invention is to provide a new rainwater collection device for collecting rainwater from a gutter for later usage.

Yet another object of the present invention is to provide a new rainwater collection device which includes a housing having a bottom wall and a peripheral wall extending upwardly from the bottom wall. The peripheral wall has a top edge defining an opening extending into the housing. A top wall defines a cover which is positionable on the housing for selectively opening and closing the opening in the housing. A supply pipe extends through and is attached to the top wall. The supply pipe is removably coupled to the gutter such that water in the gutter may enter the housing through the supply pipe. A drainage pipe is in fluid, communication with the housing. The drainage pipe extends into the peripheral wall and is positioned generally adjacent to the bottom wall. A valve is positioned in the drainage pipe for selectively opening and closing the drainage pipe.

Still yet another object of the present invention is to provide a new rainwater collection device that holds rainwater which may be used later by draining the water through a drainage pipe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
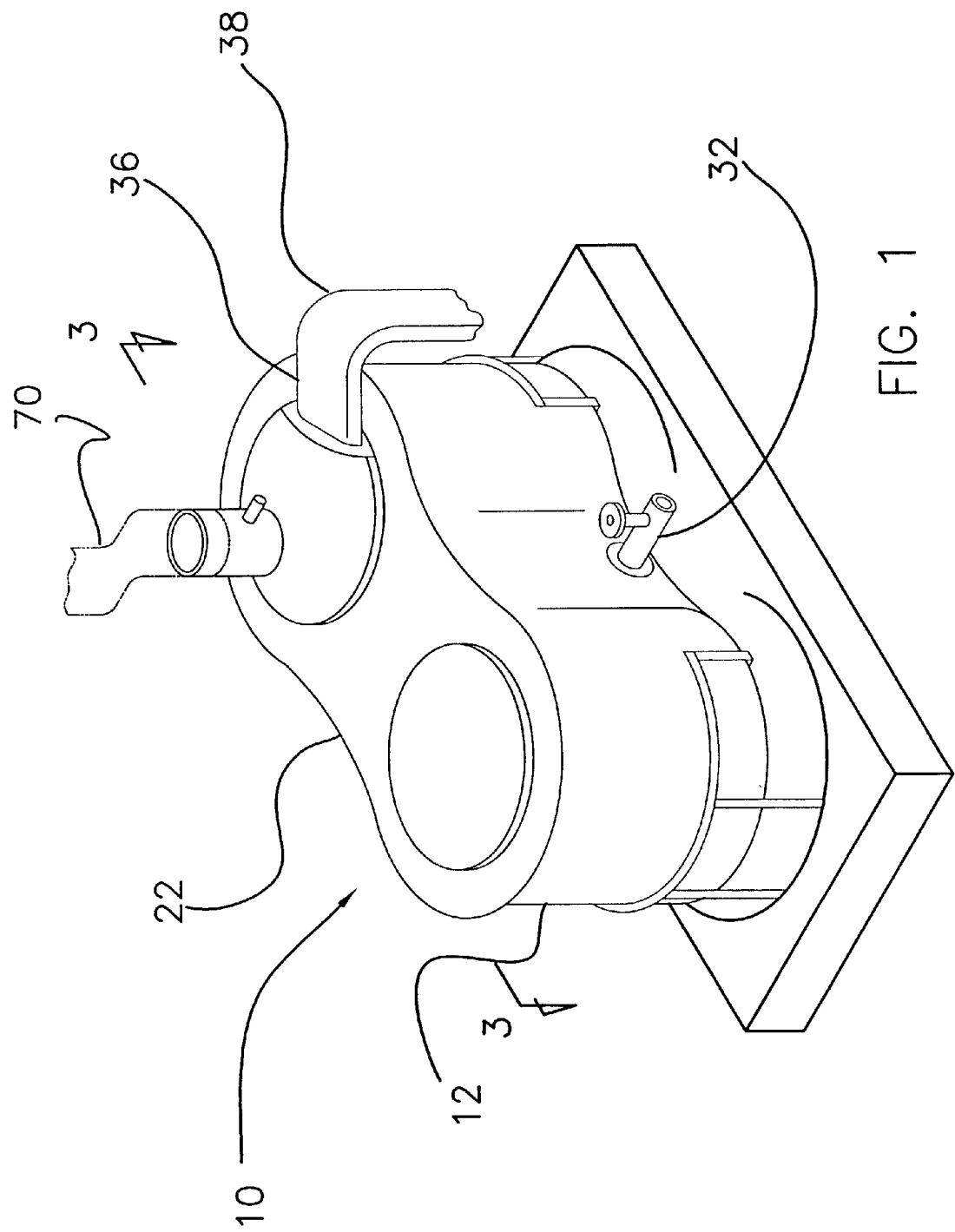
FIG. 1 is a schematic perspective view of a new rainwater collection device according to the present invention.
Figure 2:
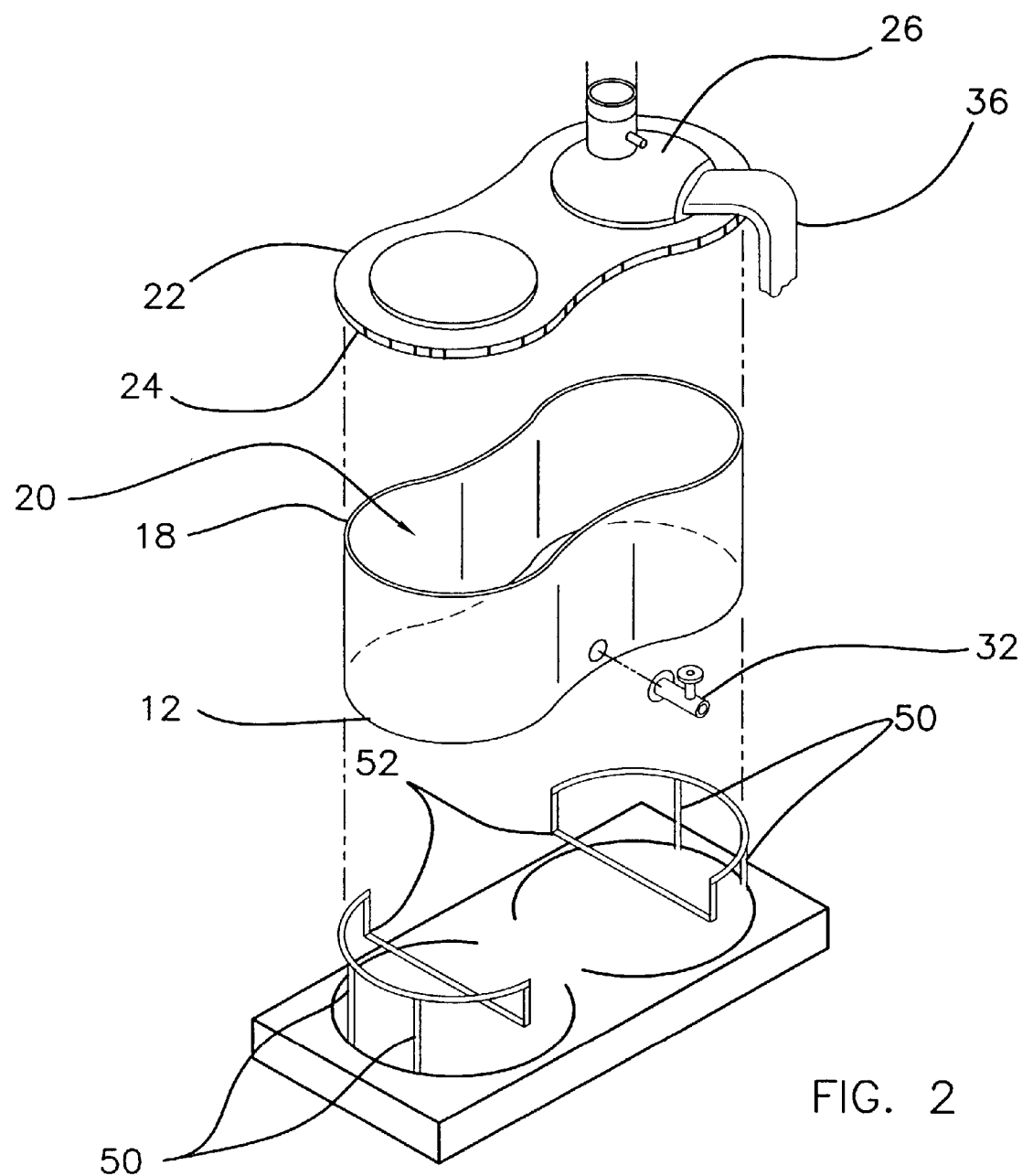
FIG. 2 is a schematic expanded view of the present invention.
Figure 3:
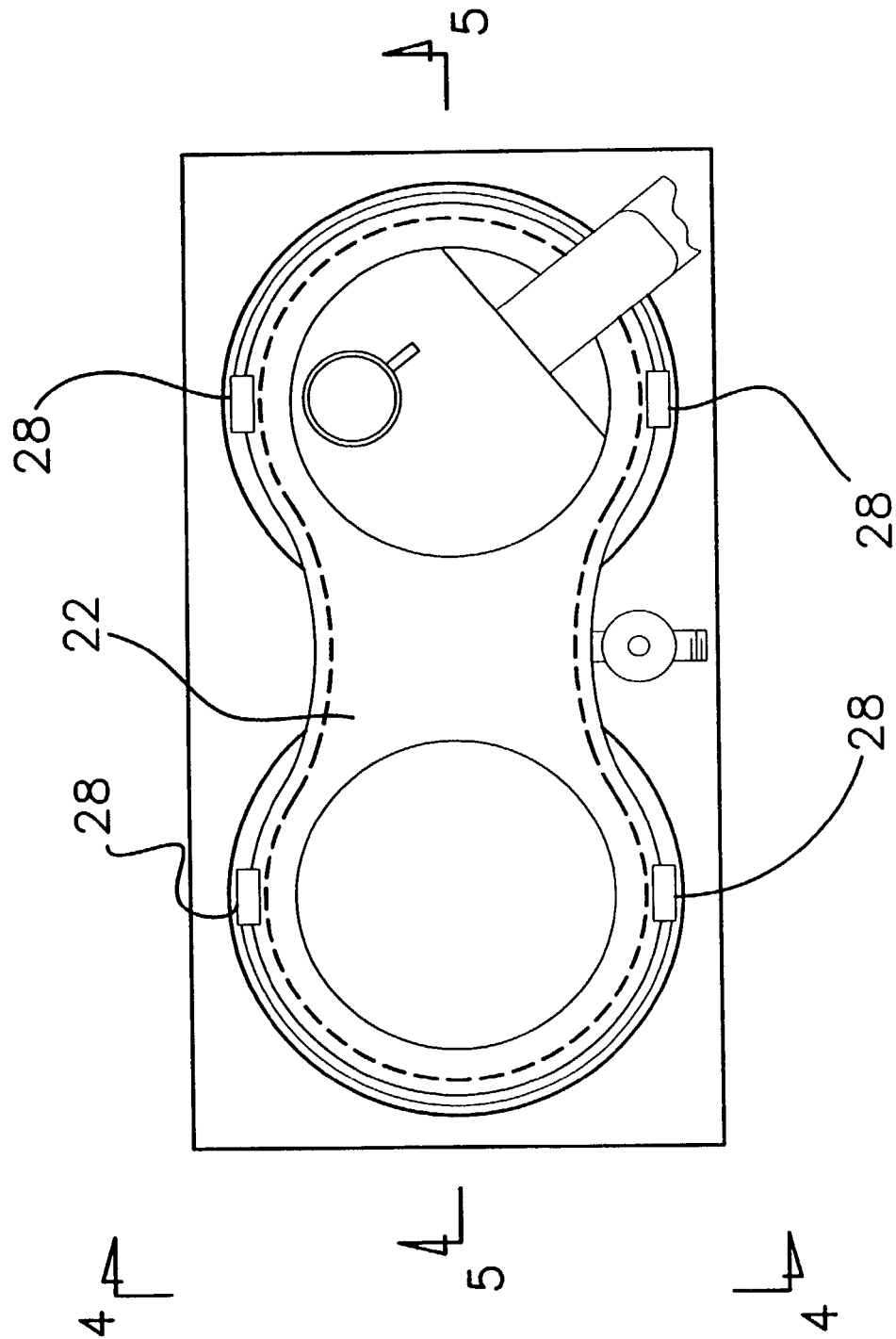
FIG. 3 is a schematic top view of the present invention.
Figure 4:
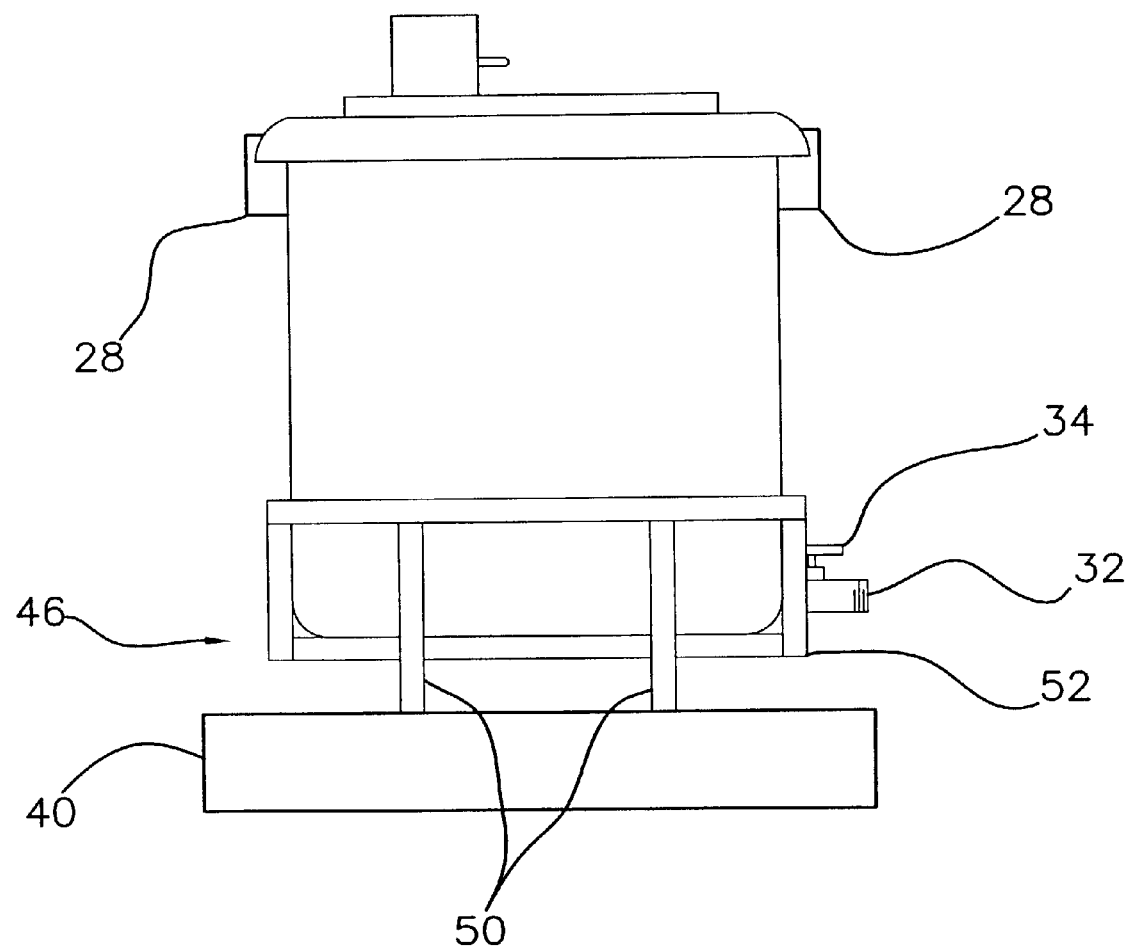
FIG. 4 is a schematic end view of the present invention.
Figure 5:
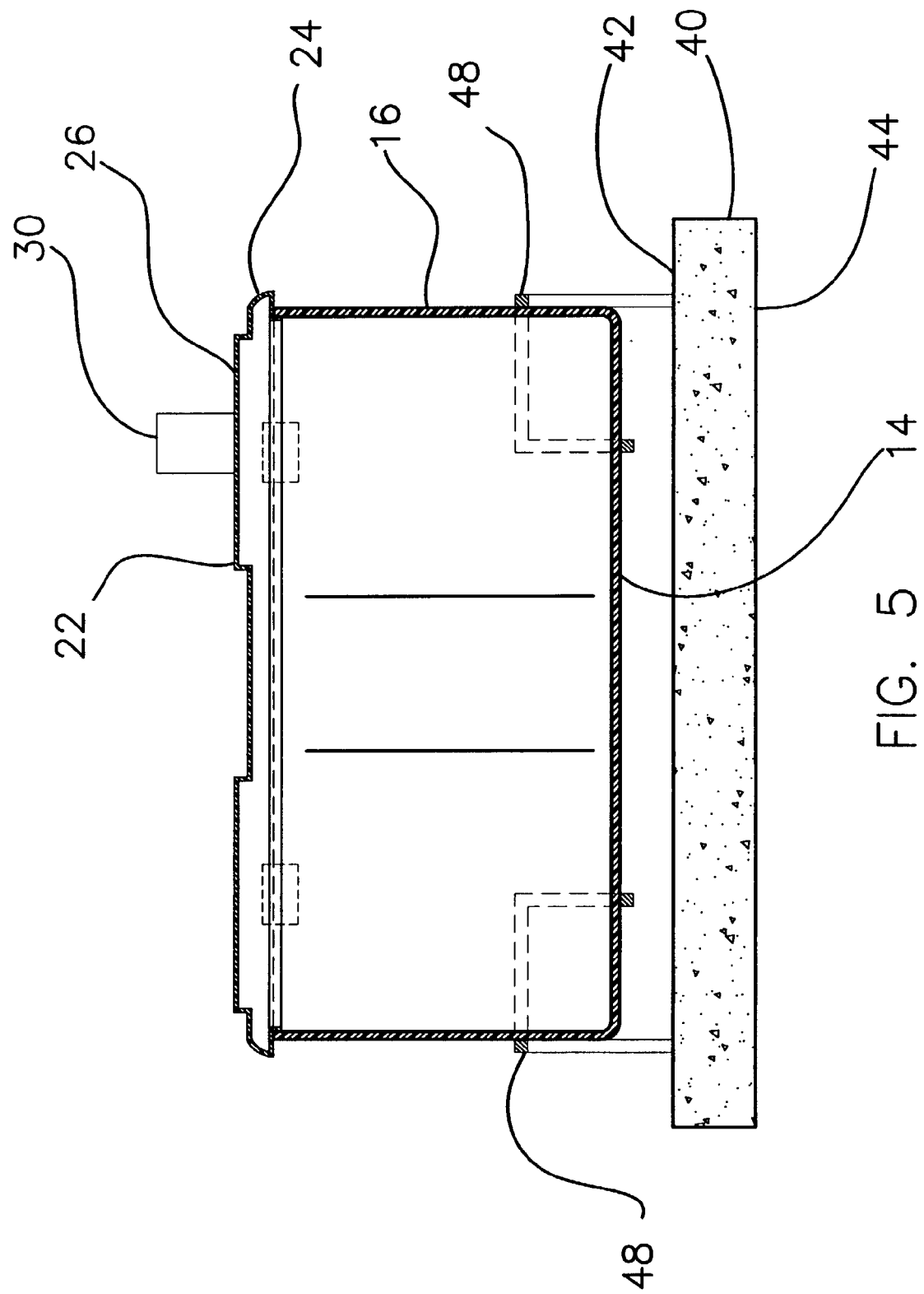
FIG. 5 is a schematic cross-sectional view taken along line 5—5 of FIG. 3 of the present invention.

With reference now to the drawings, and in particular to FIGS. 1 through 5 thereof, a new rainwater collection device embodying the principles and concepts of the present invention and generally designated by the reference numeral 10 will be described.

As best illustrated in FIGS. 1 through 5, the rainwater collection device 10 generally comprises a housing 12 having a bottom wall 14 and a peripheral wall 16 extending upwardly from the bottom wall 14. The peripheral wall 16 has a top edge 18 defining an opening 20 extending into the housing 12. A top wall 22 defines a cover which positionable on the housing 12 for selectively opening and closing the opening 20 in the housing 12. The top wall 22 has a peripheral flange 24 thereon for extending over the top edge 18 of the peripheral wall 16. The top wall 22 has a convex, or upwardly extending section 26, which extends upwardly away from the bottom wall 14 for reasons which will become readily apparent. A plurality of conventional mechanical couplers 28 removably couples the top wall to the peripheral wall 16 of the housing 12.

A supply pipe 30 extends through and is attached to the top wall 22. The supply pipe 30 is positioned in the convex section 26. The supply pipe 30 is removably coupled to a gutter 70 such that water in the gutter 70 may enter the housing 12 through the supply pipe 30.

A drainage pipe 32 is in fluid communication with the housing 12. The drainage pipe 32 extends into the peripheral wall 16 and is positioned generally adjacent to the bottom wall 14. A valve 34 is positioned in and fluidly coupled to the drainage pipe 32 for selectively opening and closing the drainage pipe 32.

An overflow pipe 36 is fluidly coupled to the convex section 26 of the top wall 22 and extends horizontally away from the housing 12. The overflow pipe 36 has a bend 38 therein generally equal to ninety degrees such that the overflow pipe 36 extends outward beyond the top wall 22 and then downward. Water rising above the upper edge 18 of the peripheral wall 16 flows outward through the overflow pipe 36.

A base 40 has a bottom side 44 and top side 42. The base 40 comprises a concrete material. A support 46 supports the housing 12 over the top side of the base. The support 46 is attached to and extends upwardly from the top side 44 of the base 40. The housing 12 is positionable on the support 46 such that a space is defined between the housing 12 and the base 40. The support 46 includes a pair of underpinnings 48. Each of the underpinnings 48 includes one pair of legs 50. The pairs are spaced from each other. Each of the legs 50 is attached to and extends upwardly from the base 40. Each of a pair of brackets 52 is attached to one of the pairs 50 such that the brackets 52 extend toward each other. The housing 12 is positionable in the brackets 52.

In use, the housing 12 collects water from the drainage gutter 70 of a dwelling for later use. The water may be drained as required through the drainage pipe 30. The support 46 holds the housing 12 off of the base 40 to keep the space between the two dry and for controlling water run-off from the housing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rain water collection device for removably attaching to a vertical gutter, said device comprising:
   a housing having a bottom wall and a peripheral wall extending upwardly from said bottom wall, said peripheral wall having a top edge defining an opening extending into said housing, a top wall defining a cover being positionable on said housing for selectively opening and closing said opening in said housing;

a supply pipe extending through and being attached to said top wall, said supply pipe being removably coupled to the gutter such that water in said gutter may enter said housing through said supply pipe;

wherein said top wall has a convex section extending upwardly away from said bottom wall, said supply pipe being positioned in said convex section;

a drainage pipe being in fluid communication with said housing, said drainage pipe extending into said peripheral wall and being positioned generally adjacent to said bottom wall, a valve being positioned in said drainage pipe for selectively opening and closing said drainage pipe; and an overflow pipe being fluidly coupled to said convex section of said top wall and extending horizontally away from said housing, wherein water rising above said upper edge of said peripheral wall flows outward through said overflow pipe;

wherein said overflow pipe has a bend therein generally equal to ninety degrees such that said overflow pipe extends outward beyond said top wall and then downward.

2. The rain water collection device as in claim 1, wherein said top wall has a peripheral flange thereon for extending over said top edge of said peripheral wall.

3. The rain water collection device as in claim 2, further including a plurality of couplers removably couple said top wall to said peripheral wall of said housing.

4. The rain water collection device as in claim 1, further including:

a base having a bottom side and top side, said base comprising a concrete material; and a support for supporting said housing over said top side of said base, said support being attached to and extending upwardly from said top side of said base, said housing being positionable on said support such that a space is defined between said housing and said base.

5. A rainwater collection device for removably attaching to a vertical gutter, said device comprising:

a housing having a bottom wall and a peripheral wall extending upwardly from said bottom wall, said peripheral wall having a top edge defining an opening extending into said housing, a top wall defining a cover being positionable on said housing for selectively opening and closing said opening in said housing, said top wall having a peripheral flange thereon for extending over said top edge of said peripheral wall, said top wall having a convex section extending upwardly away from said bottom wall;

a supply pipe extending through and being attached to said top wall, said supply pipe being positioned in said convex section, said supply pipe being removably coupled to the gutter such that water in said gutter may enter said housing through said supply pipe;

a drainage pipe being in fluid communication with said housing, said drainage pipe extending into said peripheral wall and being positioned generally adjacent to said bottom wall, a valve being positioned in said drainage pipe for selectively opening and closing said drainage pipe;

an overflow pipe being fluidly coupled to said convex section of said top wall and extending horizontally away from said housing, said overflow pipe having a bend therein generally equal to ninety degrees such that said overflow pipe extends outward beyond said top wall and then downward, wherein water rising above said upper edge of said peripheral wall flows outward through said overflow pipe;

a base having a bottom side and top side, said base comprising a concrete material;

a support for supporting said housing over said top side of said base, said support being attached to and extending upwardly from said top side of said base, said housing being positionable on said support such that a space is defined between said housing and said base, said support including a pair of underpinning, each of said underpinnings including;

one pair of legs, said pairs being spaced from each other, each of said legs being attached to and extending upwardly from said base;

a pair of brackets, each of said brackets being attached to one of said pairs such that said brackets extend toward each other, said housing being positionable in said brackets; and a plurality of couplers removably couple said top wall to said peripheral wall of said housing.

\* \* \* \* \*